(12) United States Patent
Kurtz et al.

(10) Patent No.: US 9,341,534 B2
(45) Date of Patent: *May 17, 2016

(54) ENHANCED STATIC-DYNAMIC PRESSURE TRANSDUCER SUITABLE FOR USE IN GAS TURBINES AND OTHER COMPRESSOR APPLICATIONS

(71) Applicant: Kulite Semiconductor Products, Inc., Leonia, NJ (US)

(72) Inventors: Anthony D. Kurtz, Saddle Brook, NJ (US); Boaz Kochman, Fair Lawn, NJ (US); Adam Hurst, New York, NY (US); Tonghuo Shang, Basking Ridge, NJ (US)

(73) Assignee: Kulite Semiconductor Products, Inc., Leonia, NJ (US)

(*) Notice: Subject to any disclaimer, the term of this patent is extended or adjusted under 35 U.S.C. 154(b) by 137 days.

This patent is subject to a terminal disclaimer.

(21) Appl. No.: 14/133,632

(22) Filed: Dec. 18, 2013

(65) Prior Publication Data

US 2014/0102209 A1    Apr. 17, 2014

Related U.S. Application Data

(63) Continuation of application No. 13/312,381, filed on Dec. 6, 2011, now Pat. No. 8,613,224.

(51) Int. Cl.
| G01L 13/02 | (2006.01) |
| G01L 19/00 | (2006.01) |
| G01L 9/00 | (2006.01) |
| G01L 15/00 | (2006.01) |
| G01L 19/06 | (2006.01) |

(52) U.S. Cl.
CPC ............... G01L 19/00 (2013.01); G01L 9/0052 (2013.01); G01L 15/00 (2013.01); G01L 19/0609 (2013.01)

(58) Field of Classification Search
None
See application file for complete search history.

(56) References Cited

U.S. PATENT DOCUMENTS

| 4,590,933 | A | * | 5/1986 | Itoh | 128/205.24 |
| 4,926,697 | A | * | 5/1990 | Hardin | 73/861.48 |
| 4,996,886 | A | * | 3/1991 | Hardin | 73/861.48 |
| 5,004,215 | A | * | 4/1991 | Aubry et al. | 267/140.13 |
| 5,349,347 | A | * | 9/1994 | Muller | 340/969 |
| 5,587,601 | A | * | 12/1996 | Kurtz | 257/417 |
| 6,363,792 | B1 | * | 4/2002 | Kurtz et al. | 73/753 |
| 6,543,293 | B1 | * | 4/2003 | Van De Weert et al. | 73/727 |
| 6,612,178 | B1 | * | 9/2003 | Kurtz et al. | 73/715 |
| 7,188,528 | B2 | * | 3/2007 | Kurtz et al. | 73/715 |
| 7,484,415 | B2 | * | 2/2009 | Kurtz et al. | 73/716 |
| 7,975,552 | B2 | * | 7/2011 | Kurtz et al. | 73/706 |
| 8,616,064 | B2 | * | 12/2013 | Hurst et al. | 73/702 |

* cited by examiner

*Primary Examiner* — Andre Allen
(74) *Attorney, Agent, or Firm* — Troutman Sanders LLP; James E. Schutz; Mark Lehi Jones

(57) ABSTRACT

This disclosure provides example methods, devices and systems associated with filter structures employed with sensors. In one embodiment, a method comprises receiving, at a first filter having a plurality of pores, a pressure, wherein the pressure includes a static pressure component and a dynamic pressure component; filtering, by the first filter, at least a portion of the dynamic pressure component of the pressure; outputting, from the first filter, a filtered pressure; and wherein the filtered pressure is used to determine the dynamic pressure component.

20 Claims, 12 Drawing Sheets

ENHANCED STATIC-DYNAMIC PRESSURE TRANSDUCER SUITABLE FOR USE IN GAS TURBINES AND OTHER COMPRESSOR APPLICATIONS

CROSS REFERENCE TO RELATED APPLICATION

This application is a continuation claiming priority under 35 U.S.C. §120 to U.S. patent application Ser. No. 13/312,381, filed Dec. 6, 2011, which is a continuation of U.S. patent application Ser. No. 12/614,741, filed Nov. 9, 2009, now U.S. Pat. No. 8,074,521, issued Dec. 13, 2011, all of which are entitled "ENHANCED STATIC-DYNAMIC PRESSURE TRANSDUCER SUITABLE FOR USE IN GAS TURBINES AND OTHER COMPRESSOR APPLICATIONS," and all of which are hereby incorporated by reference in their entirety as if fully set forth below.

FIELD OF THE INVENTION

The invention relates to pressure transducers for measuring low dynamic pressures ($P_d$) in the presence of high static pressures ($P_s$), and more particularly to improved low-pass filter structures employed with such transducers.

BACKGROUND

During the testing of jet engines and in many other turbine and high pressure environments, it is often desirable to measure both static pressure ($P_s$) and dynamic pressure ($P_d$). The static pressure ($P_s$), in most instances, is usually very high (200 psi) and the dynamic pressure ($P_d$) is much lower. Accordingly, the dynamic pressure ($P_d$) may typically be twenty (20) times less than the static pressure ($P_s$). Additionally, the dynamic pressure ($P_d$) is also associated with a distinct frequency which occurs at a relatively high rate, for example five thousand (5,000) cycles per second or greater. To measure static pressure ($P_s$), one requires a transducer with a relatively thick diaphragm so that it can withstand the high static pressure ($P_s$). Thick diaphragms, however, have poor sensitivity to low pressures.

U.S. Pat. No. 6,642,594 (the "'594 patent"), entitled "SINGLE CHIP MULTIPLE RANGE PRESSURE TRANSDUCER DEVICE", which issued on Nov. 4, 2003 to A. D. Kurtz, the inventor herein and is assigned to Kulite Semiconductor Products, Inc., the assignee herein, discloses problems with transducers designed to measure large pressures being utilized to measure low pressures. A pressure transducer adapted to measure relatively large pressures typically suffers from relatively poor resolution or sensitivity when measuring relatively low pressures because, as a span of the sensor increases, the resolution or sensitivity of that sensor at the ends of the span decreases.

Due to the properties of pressure sensors, it is extremely difficult to measure both static pressure ($P_s$) and dynamic pressure ($P_d$) unless one uses a thick diaphragm for high static pressure ($P_s$) in conjunction with a thin diaphragm for low dynamic pressure ($P_d$) fluctuations. However, a thin diaphragm will rupture when exposed to high static pressure ($P_s$). Such a thin diaphragm can be preserved by equalizing pressure on both sides of the diaphragm. However, if static ($P_s$) and dynamic pressures ($P_d$) are equal on both sides of the diaphragm, the sensor will be unable to make a pressure reading. If static pressure ($P_s$) is equal on both sides of the diaphragm, and dynamic pressure ($P_d$) is present only on one side, then the sensor will be able to accurately read the dynamic pressure ($P_d$) only. Therefore, there is need for a filter that can transmit high static pressure ($P_s$) to one side of a diaphragm while canceling out dynamic pressure ($P_d$).

U.S. Pat. No 6,642,594, entitled "SINGLE CHIP MULTIPLE RANGE PRESSURE TRANSDUCER DEVICE," demonstrates that a low pressure sensor can be fabricated on the same chip as a high pressure sensor. Two sensors of differing pressure ranges are achieved by fabricating an enlarged diaphragm on the same chip as a smaller diaphragm both of the same thickness. The enlarged diaphragm sensor can measure the low, dynamic pressures ($P_d$), while the smaller diaphragm with identical thickness measures the high static pressure ($P_s$) in the environment. U.S. Pat. No. 7,057,247, entitled "COMBINED ABSOLUTE DIFFERENTIAL TRANSDUCER," issued to A. D. Kurtz, the inventor herein, and assigned to Kulite Semiconductor Products, Inc., presents an absolute and differential pressure sensor fabricated on a single chip. The static and dynamic pressure sensors in accordance with embodiments of the present invention may combine both of these patents into a single chip that contains a high pressure, absolute sensor with a thick diaphragm to measure the large static pressures ($P_s$) and a low pressure, differential sensor with an enlarged diaphragm that is may be substantially the same thickness as that of the static sensor to measure the dynamic pressures ($P_d$). Through the use of a filter disclosed herein that passes the high static pressure ($P_s$) but attenuates the dynamic pressure ($P_d$), only the large static pressure ($P_s$) is transmitted to the backside of the differential, dynamic sensor's diaphragm. It is this filter that enables the dynamic sensor to measure solely the dynamic pressure ($P_d$) within the high pressure environment. U.S. Pat. No. 6,595,066, entitled "Stopped Leadless Differential Sensor," issued to A. D. Kurtz, the inventor herein, and assigned to Kulite Semiconductor Products, Inc., presents a micro-machined structure referred to as a "stop" that prevents the dynamic sensor's diaphragm from deflecting beyond its elastic region, thereby preventing it from rupturing during the transience of the filter.

SUMMARY OF THE INVENTION

Embodiments of the present invention are directed to a filter assembly for use with a static-dynamic piezoresistive pressure sensor that measures low amplitude, dynamic pressure ($P_d$) perturbations superimposed on top of a high static pressure ($P_s$) through the implementation of a low-pass mechanical filter assembly. The static and dynamic sensor may be disposed on the same substrate and have substantially identical thickness. The filter assembly may comprise a dual lumen reference tube and a removable filter subassembly further comprising a porous metal filter and narrow diameter restrictor tube. The transducer, which may be capable of operating at ultra-high temperatures and in harsh environments, may comprise a static piezoresistive pressure sensor, which measures the large pressures on the order of two hundred pounds per square inch (200 psi) and greater, and an ultrasensitive, dynamic piezoresistive pressure sensor which may capture small, high frequency pressure oscillations on the order of a few psi or less. The filter assembly may transmit static pressure ($P_s$) to the back of the dynamic pressure sensor to cancel out the static pressure ($P_s$) present at the front of the sensor, while keeping dynamic pressure ($P_d$) from reaching the back of the sensor.

The removable subassembly may be detachably connected to the body of the transducer while the dual lumen reference tube may be fixedly attached. Air may first pass through the porous metal filter and then through the narrow diameter restrictor tube. The pore size of the metal filter and diameter of the tube may be selected to maximize damping of dynamic pressure ($P_d$) fluctuations. After passing through the removable filter subassembly, the air may pass through a dual lumen tube. The dual lumen tube may comprise an outer tube and an inner tube brazed within the outer tube. The dimensions of the inner and outer tubes may be selected to maximize viscous damping of the dynamic pressure ($P_d$). The filter assembly preferably completely, or at least substantially, filters out dynamic pressure ($P_d$) by allowing only pressure below a certain frequency threshold to reach the back or bottom of the dynamic sensor.

An exemplary embodiment of the invention may be a filter comprising a removable filter subassembly and a reference tube. The filter may be adapted for use with a differential sensor for providing at an output a voltage proportional to a low dynamic pressure ($P_d$) at a high frequency in the presence of a higher static pressure ($P_s$) at a lower frequency. The sensor may be operative to receive the static and dynamic pressures ($P_s$) and ($P_d$) on a top surface and to receive only said static pressure ($P_s$) at a bottom surface due to the operation of the filter suppressing said dynamic pressure ($P_d$). Therefore, the sensor may provide an output indicative only of said dynamic pressure ($P_d$) due to the cancellation of said static pressure ($P_s$) acting upon both the top and bottom surfaces of the sensor Another exemplary embodiment of the invention may comprise a low pass filter assembly for a pressure transducer. The filter assembly may include a removable filter subassembly having a body defining an elongate chamber. A porous metal filter and a plug with a tube disposed therein may be positioned within the chamber. The filter assembly may further include a reference tube. The reference tube may further comprise an outer tube and an inner tube disposed within the outer tube.

A further exemplary embodiment may be a method for providing at an output a voltage proportional to a high frequency, low dynamic pressure ($P_d$) in the presence of a higher static pressure ($P_s$) in an environment. The method may comprise exposing a top surface of a diaphragm of a transducer to the static and dynamic pressures ($P_s$) and ($P_d$). The method may further comprise providing a fluid communication pathway between the environment and a bottom surface of the diaphragm of the transducer, and filtering out the dynamic pressure ($P_d$) along the pathway.

DETAILED DESCRIPTION

Figure 1A:
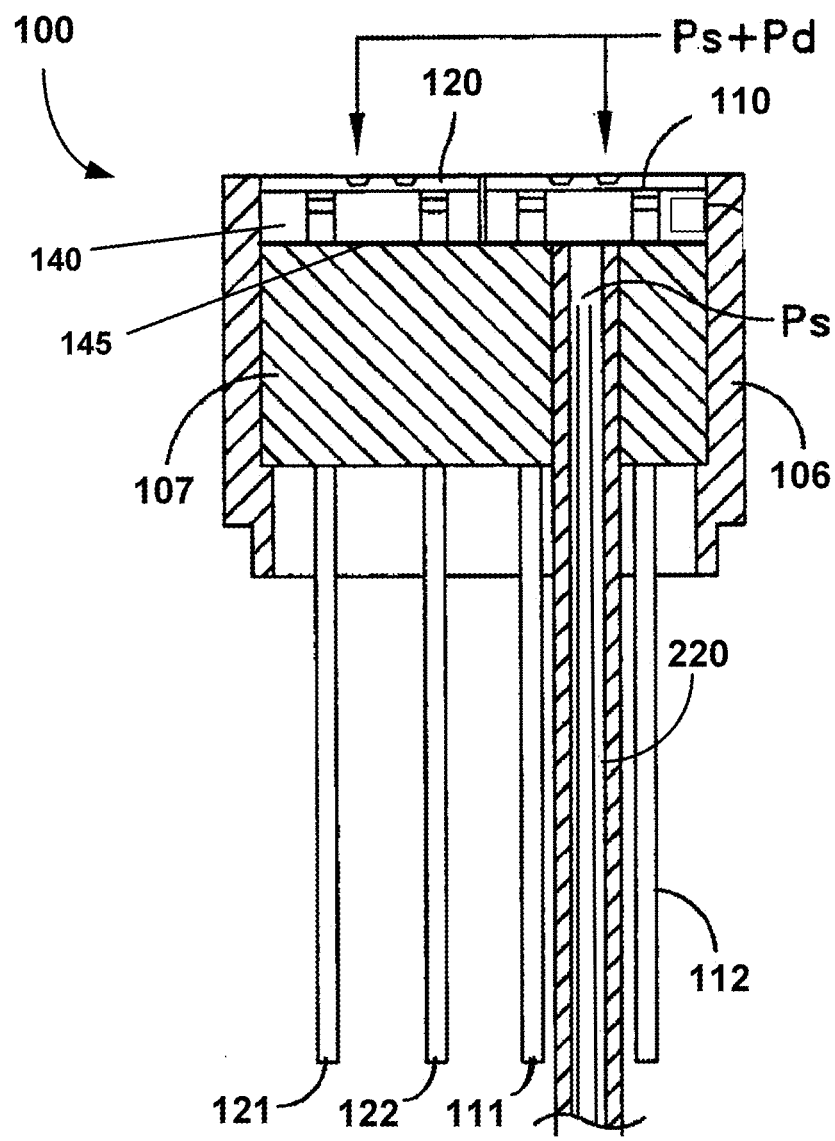
FIG. 1A illustrates a portion of a pressure transducer in accordance with an exemplary embodiment of the invention.

Referring now to the figures, wherein like reference numerals represent like parts throughout the several views, exemplary embodiments of the present invention will be described in detail. Throughout this description, various components may be identified having specific values or parameters; however, these items are provided as exemplary embodiments. Indeed, the exemplary embodiments do not limit various aspects and concepts of the present invention as many comparable parameters, sizes, ranges, and/or values may be implemented.

FIG. 1A illustrates a portion of a static-dynamic pressure transducer 100 (referred to herein as static-dynamic pressure transducer, static-dynamic transducer, pressure transducer, sensor, or transducer) in accordance with an exemplary embodiment of the invention. The pressure transducer 100 may comprise two leadless piezoresistive sensors, a dynamic pressure sensor 110 and a static pressure sensor 120 disposed within a header 106. The sensors 110 and 120 can be mounted on header pins in accordance with the methods disclosed in U.S. Pat. No. 5,955,771, entitled, "SENSORS FOR USE IN HIGH VIBRATIONAL APPLICATIONS AND METHODS FOR FABRICATING THE SAME," which issued on Sep. 21, 1999 to A. D. Kurtz et al., the inventor herein, and is assigned to Kulite Semiconductor Products, Inc., the assignee herein. This patent is hereby incorporated by reference in its entirety as if fully set forth herein.

Figure 1B:
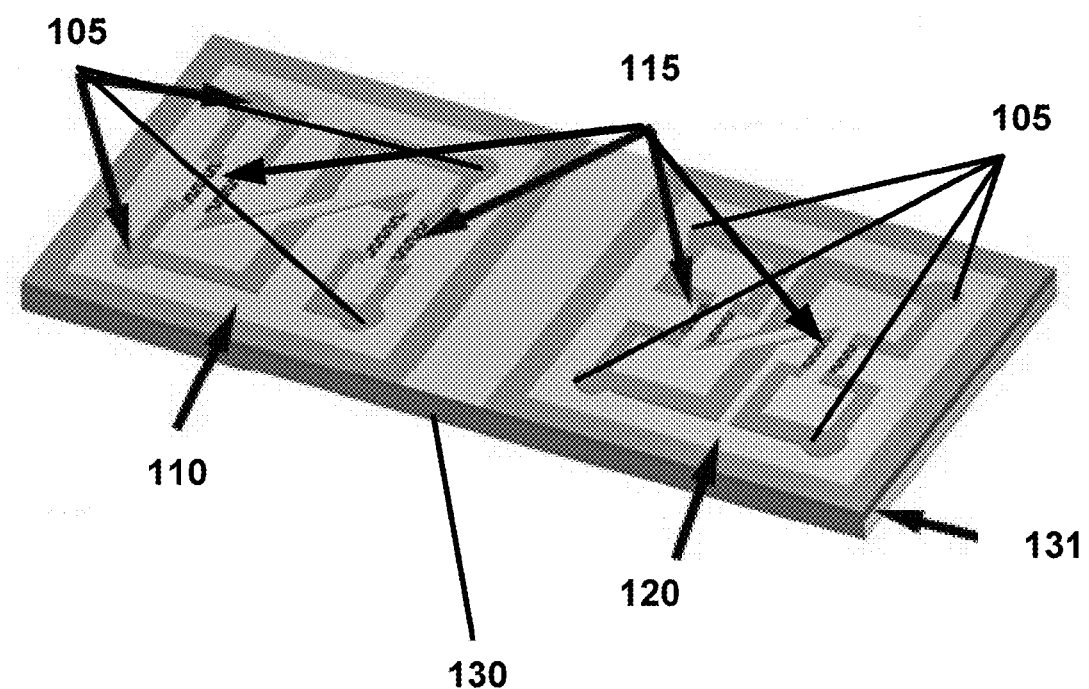
FIG. 1B illustrates dynamic and static sensors of a transducer in accordance with an exemplary embodiment of the invention.

FIG. 1B illustrates dynamic 110 and static 120 sensors of the transducer 100 in accordance with an exemplary embodiment of the invention. The transducer 100 may use leadless, silicon-on-insulator piezoresistive sensing technology (SOI) utilizing a plurality of contacts 105 for sensors 110 and 120, placing both sensors 110 and 120 on a substrate 130. Each of the sensors 110 and 120 may comprise piezoresistors 115. In an exemplary embodiment, the piezoresistors 115 may be p-type diffused monocrystalline Si piezoresistors. The piezoresistors 115 may be dielectrically isolated from the substrate 130 by an insulator 131. In an exemplary embodiment, the insulator 131 can be a high quality $SiO_2$ (oxide). The sensors 110 and 120 may exhibit excellent static and dynamic performance characteristics and may be ideally suited for measuring pressure in high combustion environments. The sensors 110 and 120 may preferably be light and vibration insensitive, and function at temperatures upwards of six hundred degrees Celsius (600° C.).

The static pressure sensor 120 may be a high pressure (200 psi or greater) absolute gauge, and the dynamic pressure sensor 110 may be a low pressure (50 psi or less) differential gauge on the same silicon substrate. The sensors 110 and 120 may be fabricated simultaneously directly next to each other.

Figure 1C:
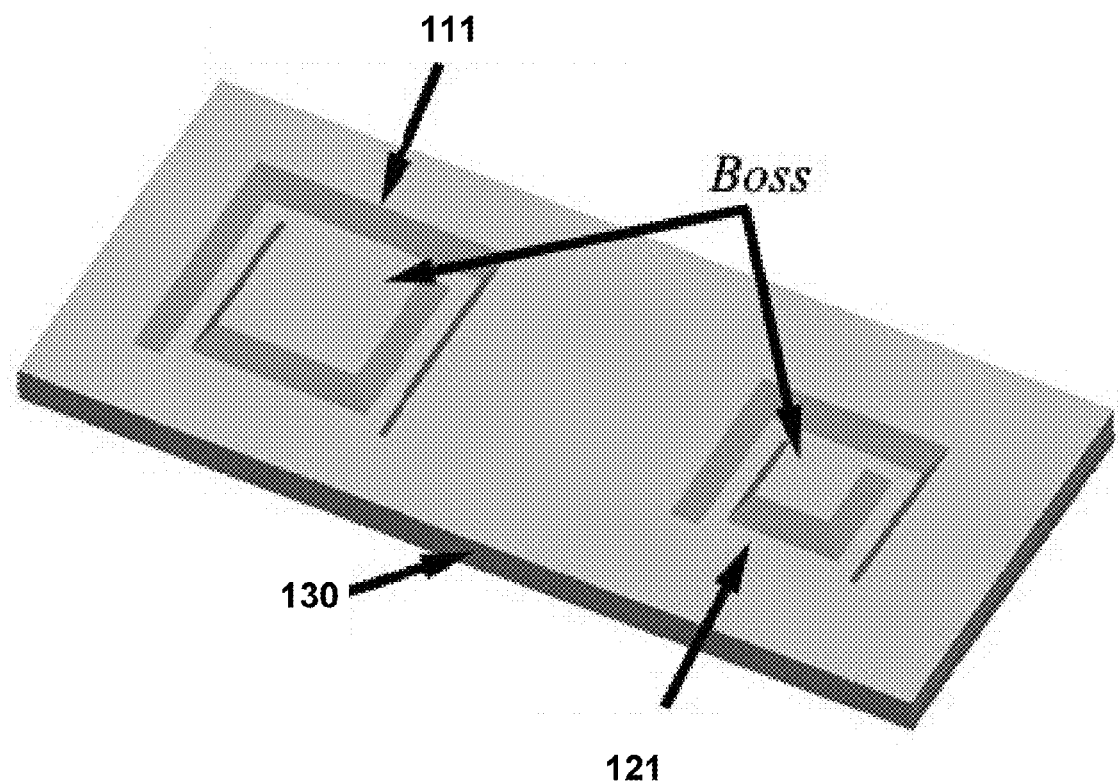
FIG. 1C illustrates micro-machined diaphragms of a transducer in accordance with an exemplary embodiment of the invention.

FIG. 1C illustrates micro-machined diaphragms 111 and 121 corresponding to sensors 110 and 120 of the transducer 100 in accordance with an exemplary embodiment of the invention. The sensors 110 and 120 may employ two distinct deflecting diaphragms 111 and 121. A dynamic diaphragm 111 may correspond to the dynamic pressure sensor 110 and a static diaphragm 121 may correspond to the static pressure sensor 120. The diaphragms 111 and 121 may be micro-machined to each have a boss and a substantially identical thickness, while the geometry of each diaphragm may be different. For example, the dynamic diaphragm 111 may have a large active area that deflects significantly when exposed to small pressures. The static diaphragm 121 may have a smaller active area that deflects very little under such small pressures.

Figure 1D:
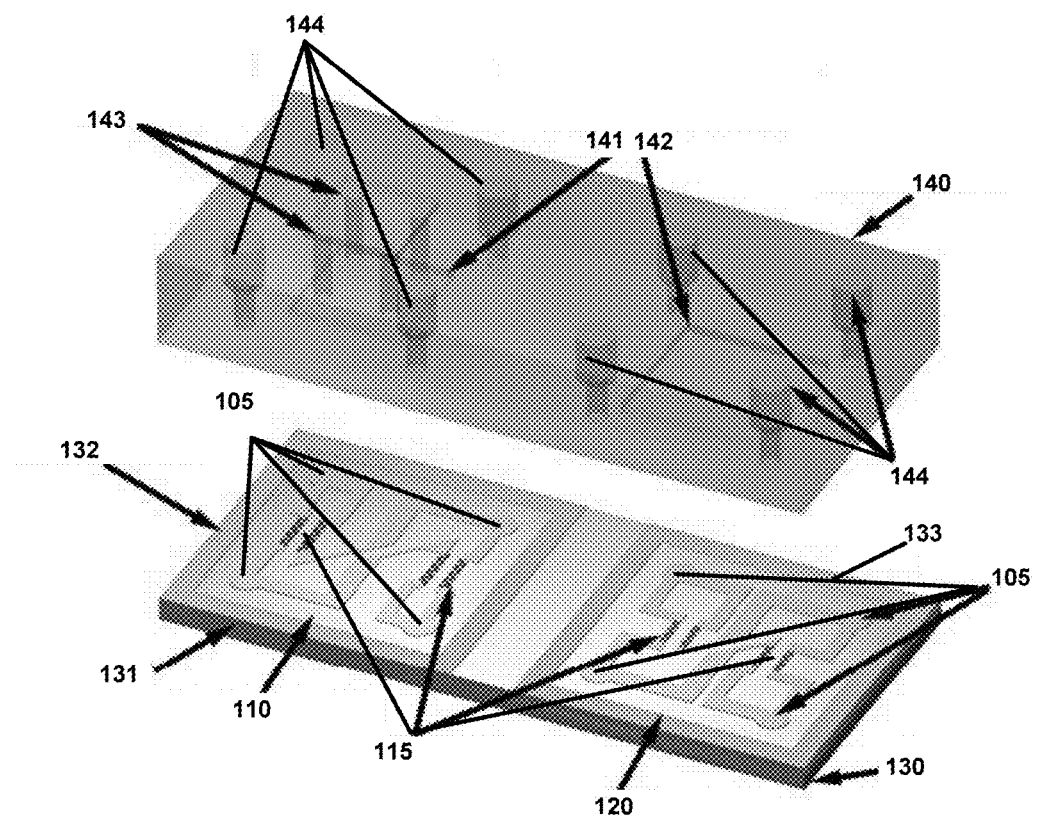
FIG. 1D illustrates an exemplary embodiment of static and dynamic sensors fabricated in accordance with leadless design rules consistent with leadless packaging methods known in the art.

FIG. 1D illustrates an exemplary embodiment of sensors 110 and 120 fabricated in accordance with leadless design rules consistent with leadless packaging methods known in the art. Sensors 110 and 120 may be fabricated to comprise diaphragms 111 and 121 (not pictured, see FIG. 1C) micro-machined on a first side of a substrate 130. The diaphragm side of the substrate 130 may be exposed to pressure in the environment and piezoresistive elements 115 may be disposed on a second side of the substrate 130, which may be hermetically sealed by rims 132 and 133 within contact cavities 141 and 142 of a contact glass 140. In order to prevent the diaphragms 111 and 121 from over-stressing during extreme pressure conditions, the contact glass 140 may have two stops (not pictured). A stop may be used in conjunction with the dynamic sensor 110 to prevent the diaphragm of the sensor 111 from fracturing during the transience of the low-pass mechanical filter. Transience refers to the delay of the filter in transmitting static pressure ($P_s$) to the back of the diaphragm 111 through holes 143 in the contact glass 140 during sudden spikes or drops in pressure. For example, if the static pressure ($P_s$) abruptly increases, the side of the diaphragm 111 facing the environment may be immediately exposed to the higher static pressure while the other side of the diaphragm 111 remains exposed to the prior static pressure level as the higher pressure level makes its way through the filter. Such brief exposure to a dramatic static pressure ($P_s$) differential could rupture the diaphragm 111 of the dynamic pressure sensor 110. The stop on the contact glass 140, however, may limit deflection of the diaphragm 111 to avert such damage. The contact glass 140 thereby ensures that the dynamic sensor 110 does not break during the system's transience and does not fatigue due to over deflection. The static sensor 120 may also have a stop to prevent it from fracturing due to any unforeseen pressures above the rated pressure of the sensor 120.

The stops, along with the fact that the static pressure ($P_s$) within the environment is passed to the backside of the dynamic sensor 110 through holes 143, keep the diaphragms 111 and 121 well within the elastic region of silicon. Since the silicon remains well within its elastic region, the diaphragms 111 and 121 can withstand significant over-pressure conditions without hindering their performance characteristics.

After the contact glass 140 has been bonded to the substrate 130, only the metalized contact pads 105 are exposed through pin holes 144 in the glass 140, while the entire sensing network is hermetically sealed by the contact glass 140 and rims 132 and 133. The robust design of the static and dynamic pressure sensors 110 and 120 provides for excellent frequency response characteristics. The spectral response of the static and dynamic sensors 110 and 120 depends upon of the resonant frequency of the sensing structures. The static and dynamic sensor 110 and 120 structures are considered a second-order system with damping. Based on this assumption, the acceptable frequency ranges of the sensors to within ±5% error are 20% of their respective natural frequencies.

The resonant or natural frequency of a transducer is defined by its geometric and material properties, which include diaphragm dimensions, Poisson's ratio, and Young's modulus. Since the static and dynamic sensors 110 and 120 have complex diaphragm structures, the resonant frequencies are determined experimentally using a shock tube, which generates a pressure step input. The experimental results from shock tube tests of an exemplary embodiment of a sensor indicate that the static sensor 120 has a resonant frequency of approximately one megahertz (1 MHz) and the dynamic sensor 110 has a resonant frequency of four hundred fifty kilohertz (450 kHz). Based upon these natural frequencies, the useful frequency ranges for the static and dynamic sensors 110 and 120 in accordance with an exemplary embodiment are two hundred kilohertz (200 kHz) and ninety kilohertz (90 kHz), respectively. Therefore, the static and dynamic sensors 110 and 120 are excellent candidates for dynamic pressure measurements. It is important to note that the dynamic pressure sensor 110 may not be sensitive to low frequency pressure changes (25 Hz and below), as such pressures will be passed by the filter assembly 200 to the backside of the dynamic sensor's 110 diaphragm. In addition, these frequency ranges are also dependent upon the pressure range of a sensor. Higher pressure sensors, for example, have higher natural frequencies, and, thus, a larger useable frequency range. Those skilled in the art will recognize that these results are for example only and are not intended to limit the scope of the invention.

As previously mentioned, in an exemplary embodiment, the diaphragms 111 and 121 of the sensors 110 and 120 may have substantially identical thicknesses. In other contemplated embodiments, the static pressure sensor 120 can have a thicker diaphragm 121 than the dynamic sensor 110, allowing the sensor 120 to withstand higher pressures. The top surfaces of the diaphragms 111 and 121 may be exposed to the total pressure of the environment to be measured, including static pressure ($P_s$) and dynamic pressure ($P_d$) components. The total pressure is therefore the sum of the static and dynamic pressures ($P_s$)±($P_d$). In an exemplary embodiment, the measured environment comprises any fluid or gas in which the transducer 100 is disposed. In an exemplary operating environment, such as a combustion chamber, the static pressure ($P_s$) may be of a relatively high value, for example one hundred pounds per square inch (100 psi) or more. The dynamic pressure ($P_d$) may appear as a ripple on top of the static pressure ($P_s$), and may be characterized by a relatively high frequency on the order of magnitude of five kilohertz (5 kHz) and above, and a low value of five pounds per square inch (5 psi) or less.

The transducer 100 may have ultra-high sensitivity for acoustic pressure disturbances that oscillate at frequencies above twenty-five hertz (25 Hz), thereby making it able to detect the earliest onset of compressor or combustion instabilities. In addition, the transducer 100 may measure large static pressures ($P_s$) within a compressor or combustion chamber with linear spectral characteristics beginning at twenty-five hertz (25 Hz) and extending to ninety kilohertz (90 kHz) for the dynamic sensor 110 and from DC to two hundred kilohertz (200 kHz) for the static sensor 120. In short, the transducer 100 is reliable at high temperatures and at large vibration levels.

After fabricating the static and dynamic sensors 110 and 120, a leadless packaging method can be used to ruggedize the sensors for high temperature and/or corrosive environments. As illustrated in FIG. 1, the sensors 110 and 120 can be mounted into a header 105 using a high temperature, non-conductive glass frit 145. The substrate 130 with the static and dynamic sensors' diaphragms 111 and 121 is preferably the only portion exposed to the environment, which enables the transducer to operate in harsh environments.

The bottom surface of the diaphragm of the static pressure sensor 120 may be insulated from the pressure of the environment by a header glass 107 disposed within the header 106. In an exemplary embodiment, there may be zero pressure (vacuum) underneath the static pressure sensor 120. Such a configuration allows the static pressure sensor 120 to serve as an absolute gauge, measuring the total environmental pressure. In contrast, the bottom surface of the diaphragm of the dynamic pressure sensor 110 may be exposed to static pressure ($P_s$), but not dynamic pressure ($P_d$) in order to differentially measure the dynamic pressure ($P_d$). A reference tube 220 may be connected to an inlet (not pictured) in the body of the transducer 100 and pass through the header glass 107 and holes 143 in the contact glass 140. The inlet may be exposed to the environment and in fluid communication with an outlet proximate the dynamic sensor 110, thereby exposing the bottom surface of the sensor 110 to the static pressure ($P_s$). The reference tube 220 may be part of a filter assembly 200 (see FIG. 2) that prevents the dynamic pressure ($P_d$) from reaching the bottom surface of the dynamic sensor 110, as will be discussed in greater detail below. In such an arrangement, the static pressure ($P_s$) cancels itself out on opposing sides of the diaphragm.

As a result of the above described arrangement, the static pressure sensor 120 may output a signal through output leads 121 and 122 indicative of the static pressure ($P_s$) acting upon the top surface of the diaphragm of the sensor 120. As discussed above, static pressure ($P_s$) is acting upon both surfaces of the diaphragm of the dynamic pressure sensor 110 and dynamic pressure ($P_d$) is only acting upon the top surface. Consequently, the static pressure ($P_s$) is canceled out and the dynamic pressure sensor 110 may output a signal through leads 111 and 112 indicative of the dynamic pressure ($P_d$) acting upon the top surface of the diaphragm. While the output of the static pressure sensor 120 is also responsive to the dynamic pressure ($P_d$), the dynamic pressure ($P_d$) is negligible compared to the static pressure ($P_s$).

Figure 2:
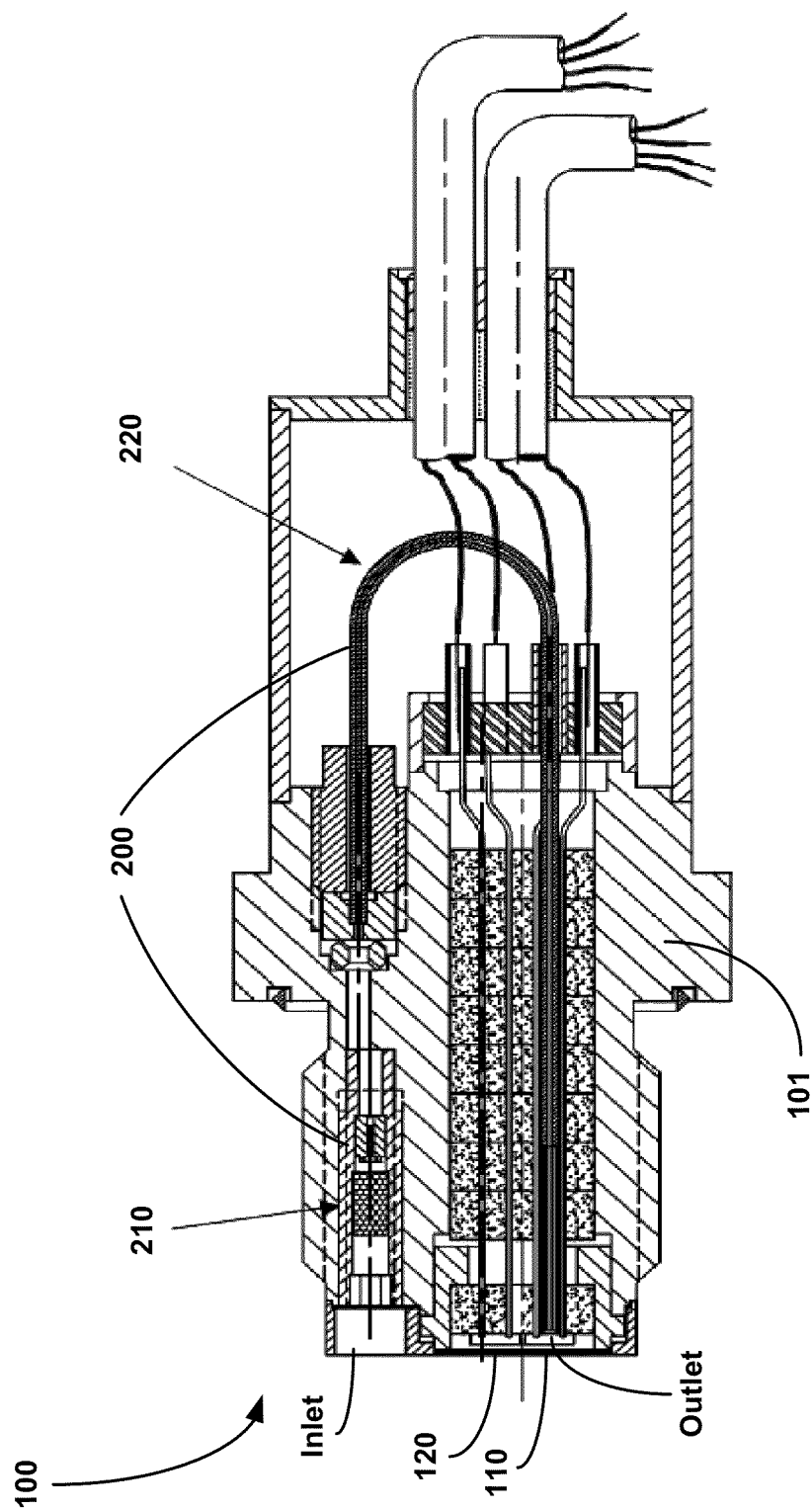
FIG. 2 illustrates a pressure transducer and filter assembly in accordance with an exemplary embodiment of the invention.

FIG. 2 illustrates a pressure transducer 100 and filter assembly 200 (referred to herein as assembly, filter assembly, or low pass filter assembly) in accordance with an exemplary embodiment of the invention. The filter assembly 200 may be a low-pass filter allowing only pressure below a predetermined oscillation frequency threshold to pass therethrough. As discussed above, dynamic pressure ($P_d$) varies at a relatively high frequency while static pressure ($P_s$) varies at a substantially lower frequency. Therefore, the filter assembly 200 may transmit static pressure ($P_s$) and filter-out dynamic pressure ($P_d$).

The damping properties of the mechanical configuration of the assembly 200 and its components enable the filter assembly 200 to selectively transmit pressure based upon frequency. This ability of the filter assembly 200 is due to the principle of viscous damping. Viscous forces attenuate pressure signals through particle interactions. It is well understood that viscous effects in an air medium become increasingly significant as the structure size in which the air is traveling decreases to the micro-scale. Normally, viscous effects in air-filled pipes are negligible, since pipe diameter is often large in comparison to pipe length. If pipe diameter is, however, small on the order of one thousandth of an inch (1 mil) to fifteen thousandths of an inch (15 mils) and pipe length is ten thousandths of an inch (10 mils) to several inches, viscous effects may cause substantial damping of periodic pressure signals. Besides dampening out high frequency pressures, a system of low-pass mechanical filtering structures resonates. A system's resonant frequencies and harmonics cause the amplification or attenuation of the pressure signal at certain oscillatory pressures. The low-pass mechanical structures preferably dampen these resonances in addition to the high frequency pressure oscillations.

As will be discussed in more detail below, the primary filter 215 of assembly 200 may comprise such micro-sized pores that enable viscous particle interactions to dampen periodic pressures and resonances. The filter 215 may feed into a differential or reference tube 220 that routes the filtered static pressure signal to the back of the dynamic sensor's 110 diaphragm 111. These micro-scale pores may limit the magnitude of the propagating sound waves entering the tube 220. An additional narrow diameter restrictor tube 216 may be disposed between the filter 215 and the reference tube 220 to further increase viscous damping. The reference tube 220 may comprise two tubes, one fitted within the other, that decrease the effective diameter of the reference tube 220 such that it is sufficiently small enough for viscous forces to impact flow. The dimensions and configuration of the restrictor tube 216, reference tube 220, and filter 215 can be selected to adjust the threshold frequency that the assembly 200 will permit to pass in order to maximize the sensitivity of the dynamic pressure sensor 110.

The filter assembly 200 may comprise a removable filter subassembly 210 (referred to herein as removable filter subassembly, filter subassembly, or subassembly) and a dual lumen reference tube 220 (referred to herein as dual lumen reference tube, dual layer reference tube, reference tube, or tube). The filter assembly 200 may be disposed within the body 101 of the transducer 100. The subassembly 210 may be disposed substantially inline with the body 101 of the transducer 100. Further, the subassembly 210 may be positioned proximate an inlet in the body 101 of the transducer 100. The inlet may be exposed to the environment in which the transducer 100 is disposed, and allow fluid communication between the environment and the subassembly 210. As previously mentioned, in an exemplary embodiment of the invention, the subassembly 210 may be removable. In certain contemplated embodiments, the subassembly 210 may be detachably connected to the body 101 of the transducer 100, as will be discussed in greater detail below. For example, the subassembly 210 may be inserted through the inlet and secured to the body 101.

The filter assembly 200 may further comprise a dual lumen reference tube 220. The reference tube 220 may be disposed partially or entirely within the body 101 of the transducer 100. The reference tube 220 may comprise an outer tube or lumen 221 and an inner tube or lumen 222. The reference tube 220 may be bent into a "U" or "hook" shape. The configuration of the reference tube 220 will be discussed in greater detail below in reference to FIG. 4.

The reference tube 220 may be in fluid communication with the subassembly 210. Further, the tube 220 may be in fluid communication with an outlet positioned proximate the lower surface of the diaphragm of the dynamic pressure sensor 110. Accordingly, the inlet may be in fluid communication with the outlet via a pathway defined by at least the subassembly 210 and reference tube 220. As discussed above, the pressure in the environment may contain dynamic pressure ($P_d$) and static pressure ($P_s$) components. Both of these components may be present at the inlet. However, only the static pressure ($P_s$) component is present at the outlet because the filter assembly 200 filters out pressure fluctuations above a predetermined frequency threshold.

The configuration of the transducer 100 and filter assembly 200 described above provides for static pressure ($P_s$) to be present at both the upper and lower sides of the diaphragm of the dynamic pressure sensor 110. As discussed above, the diaphragm of the dynamic pressure sensor 110 is relatively thin, to enable measurement of small pressure differences, and would likely rupture under high pressure, such as the static pressure ($P_s$). Further, the configuration provides for dynamic pressure ($P_d$) to be present at only the upper surface of the diaphragm of the dynamic pressure sensor 110. Therefore, since the static pressure ($P_s$) is present on both sides, it is canceled out, thus preventing rupture of the diaphragm of the dynamic sensor 110. Since the dynamic pressure ($P_d$) is present only at the top surface of the diaphragm, it may be read by the dynamic pressure sensor 110. The combination of the dynamic pressure sensor 110 and static pressure sensor 120 in the configuration described above allows for sensing both the static pressure ($P_s$) and lower dynamic pressure ($P_d$) with high sensitivity compared to conventional methods. The particular mechanics of how the filter assembly 200 prevents passage of dynamic pressure ($P_d$) will be discussed in greater detail below.

Figure 3:
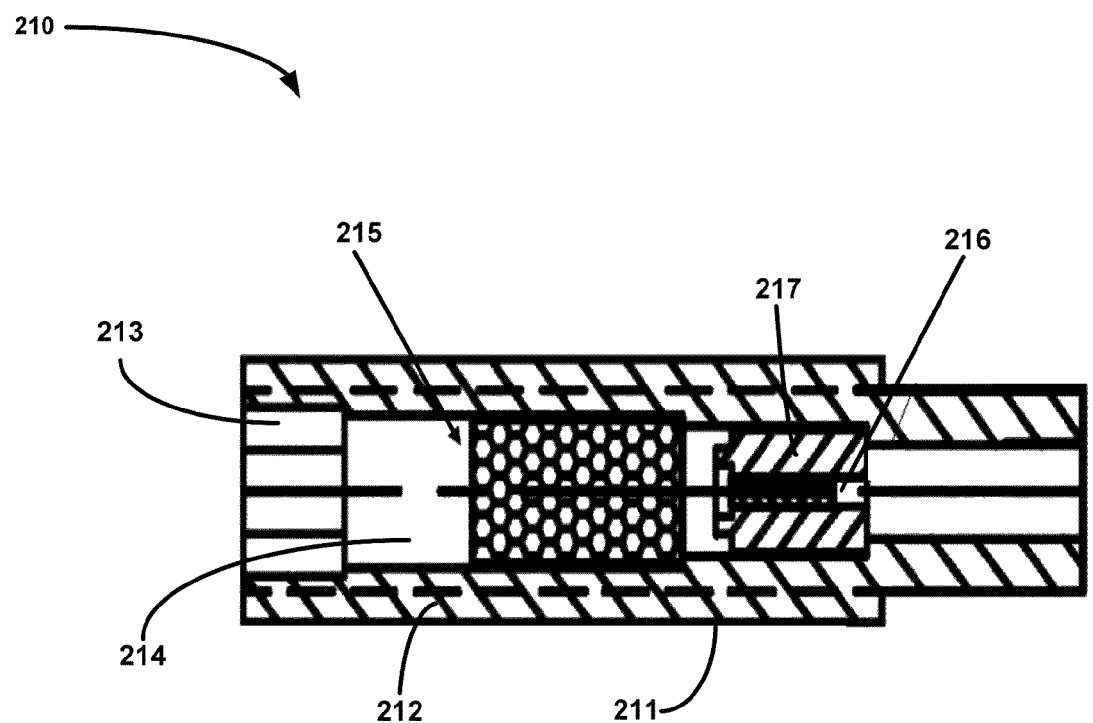
FIG. 3 illustrates a removable filter subassembly in accordance with an exemplary embodiment of the invention.

FIG. 3 illustrates a removable filter subassembly 210 in accordance with an exemplary embodiment of the invention. As previously mentioned, the subassembly 210 may be detachably connected to the body 101 of the transducer 100. In a preferred embodiment, the removable filter assembly 210 may be disposed proximate an inlet in the body 101 of the transducer 100. Particularly, the subassembly 210 may be coupled to the body 101 by inserting the subassembly 210 through the inlet.

The subassembly 210 may comprise a housing 211. In an exemplary embodiment, the housing 211 may comprise threads 212 disposed along its exterior. The threads 212 may engage complementary threads in the body 101 as the housing 211 is twisted or screwed into the body 101 to attach it thereto. The housing 211 may have an opening 213 that is shaped to facilitate the threading process. For example, the opening 213 may be hex shaped such that an Allen wrench may be used to thread the housing 211 into and out of the body 101.

In other contemplated embodiments, the threads 212 may be omitted and the housing 211 may attach to the body 101 by other fastening means. For example, the housing 211 may have locking tabs or be snap-fit or press-fit into the body 101. Other suitable means for detachably coupling the housing 211 to the body 101 have also been contemplated and are within the scope of the invention.

The detachability of the filter subassembly 210 allows the subassembly 210 to be removed for a variety of reasons. The subassembly 210 can be removed for cleaning, repair, or replacement. Additionally, the detachability of the subassembly 210 enhances the tunability of the filter assembly 200. The subassembly 210 can be removed and exchanged for another subassembly having different filter characteristics depending upon the application. For example, and not limitation, an exemplary filter assembly 200 may allow pressure below three hundred hertz (300 Hz) to pass, but it may be desirable to lower the threshold to one hundred and fifty (150 Hz). To achieve the lower threshold, the subassembly 210 may be removed and replaced with a different subassembly, which combined with the reference tube 220 may provide for the desired lower frequency threshold. Similarly, the subassembly 210 can be exchanged for a different subassembly having a higher frequency threshold. The different subassemblies discussed above refer to subassemblies 210 having different damping properties, as will be discussed in greater detail below.

The housing 211 may define a chamber 214. The chamber 214 may be substantially hollow and elongate, spanning the length of the housing 211. The cross-section of the chamber 214 may be circular or another suitable shape. The cross-section may be constant or vary along the length of the chamber 214. The subassembly 210 may enable fluid communication between the inlet and the reference tube 220 (see FIG. 2) via the chamber 214.

The subassembly 210 may comprise a filter 215 disposed within the housing 211, particularly within the chamber 214. The filter 215 may be a single sintered metal structure. The pore size and length of the filter 215 may be selected to facilitate achieving the desired level of frequency damping. In a preferred embodiment, the pores of the filter 215 may be of a uniform size, and have a diameter between approximately five tenths of one millionth of a meter (0.5 microns) and twenty millionths of a meter (20 microns). This means that in one embodiment all of the pores may have a diameter of approximately five tenths of one millionth of a meter (0.5 microns) and in another embodiment of the filter 215 all the pores may have a diameter of approximately twenty millionths of a meter (20 microns). In further contemplated embodiments, the pores may all have still a different, uniform diameter between approximately five tenths of one millionth of a meter (0.5 microns) and twenty millionths of a meter (20 microns). While the diameter of the pores may vary between embodiments, in any one particular embodiment all of the pores preferably have substantially the same diameter. The range of pore diameters provided above is for a preferred embodiment. In alternative contemplated embodiments, the range of the pore sizes may be different.

Preferably, the cross-section of the filter 215 is substantially equal to the cross-section of the portion of the chamber 214 in which it is disposed. This may ensure that air cannot pass through the chamber 214 without passing through the filter 215. The removability of the subassembly 210 discussed above enables selective tuning of the filter assembly 200 by exchanging subassembly 210 for another subassembly with a filter having different pore size and/or length, hence having different damping characteristics. In this manner, the frequency threshold of the low-pass filter assembly 200 may be adjusted.

The subassembly 210 may further comprise a plug 217 positioned in the chamber 214. The plug 217 may divide the chamber 214 into two sub-chambers. A narrow diameter restrictor tube 216 may be disposed within the plug 217. The tube 216 may enable fluid communication between the sub-chambers of chamber 214 defined by the plug 217. The cross-section of the tube 216 may be circular or another suitable shape. The diameter or area of the cross-section of the tube 216 is preferably substantially smaller than the diameter or area of the cross-section of the chamber 214. Accordingly, air passing through the subassembly 210 must pass through the tube 216, and its flow is substantially restricted.

The length and diameter of the tube 216 may be predetermined based upon the desired threshold frequency of the filter assembly 200. In a preferred embodiment, the diameter of the tube 216 may be approximately one thousandth of an inch (1 mil) to five thousandths of an inch (5 mils). As discussed above, the subassembly 210 may be removable. The length and diameter of the tube 216 can be changed by exchanging the subassembly 210 for a different subassembly having a tube 216 with the desired length or diameter. Accordingly, the frequency threshold of the low-pass filter assembly 200 may be adjusted. In an exemplary embodiment, the plug 217 and tube 216 can be disposed on the opposite side of the filter 215 from the opening 213. In other contemplated embodiments, the plug 217 and tube 216 may be disposed on the same side of the filter 215 as the opening 213.

Figure 4A:
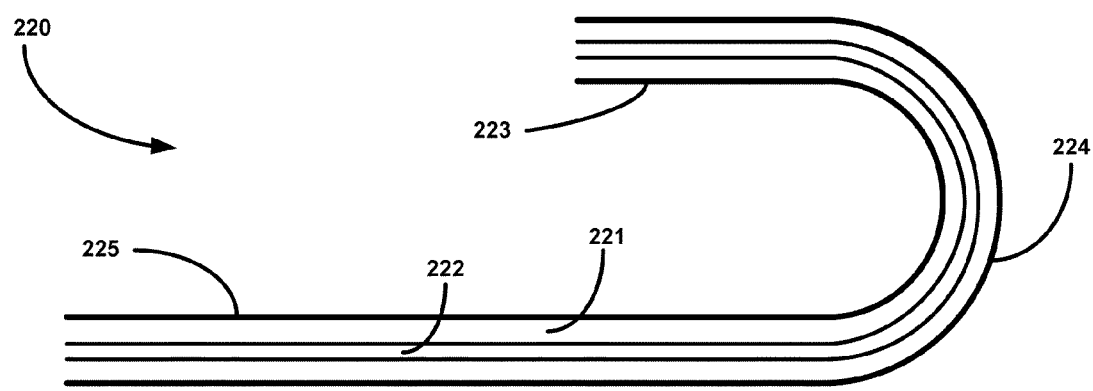
FIG. 4A illustrates a longitudinal cross-sectional view of a dual lumen reference tube in accordance with an exemplary embodiment of the invention.
Figure 4B:
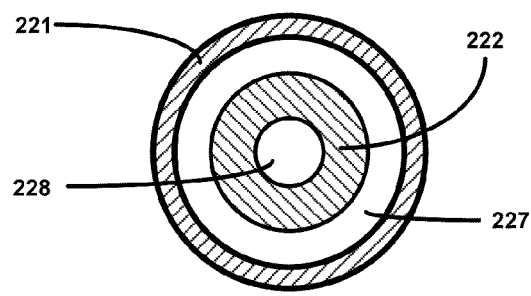
FIG. 4B illustrates a traverse cross-sectional view of a dual lumen reference tube in accordance with an exemplary embodiment of the invention.

The filter assembly 200 may also comprise a dual lumen reference tube 220. Exemplary embodiments of the reference tube 220 are illustrated in FIGS. 4A and 4B. The reference tube 220 may comprise an outer tube 221 and an inner tube 222 disposed within the outer tube 221. The reference tube 220 facilitates fluid communication between the filter subassembly 210 and the back of the diaphragm of the dynamic pressure sensor 110. In order to facilitate this fluid communication, the reference tube 220 may be bent to form a "U" or "hook" shape. The diameters and overall lengths of the tubes 221 and 222 may be selected to maximize viscous damping to prevent dynamic pressure ($P_d$) from passing through the tube 220 to the bottom surface of the diaphragm of the dynamic pressure sensor 110.

FIG. 4A illustrates a longitudinal cross-sectional view of a dual lumen reference tube 220 in accordance with an exemplary embodiment of the invention. The dual layer or lumen reference tube 220 may comprise an outer tube 221 and an inner tube 222 disposed within the outer tube 221, the inner tube 222 extending along part or all of the length of the outer tube 221. The inner tube 222 may be brazed inside the outer tube 221. In the exemplary embodiment pictured in FIG. 4A, the tube 220 is "J" or hook shaped. In accordance with the illustrated embodiment, the tube 220 may comprise a first straight section 223 in communication with a second straight section 225 via a bent section 224. The first section 223 may be shorter than the second section 225. In other contemplated embodiments, the tube 220 may be more "U" shaped and the first and second straight sections 223 and 225 may be equal or substantially equal in length. The inner and outer tubes 221 and 222 may be stainless steel or another suitable material.

FIG. 4B illustrates a traverse cross-sectional view of a dual lumen reference tube 220 in accordance with an exemplary embodiment of the invention. In an exemplary embodiment, the cross-sections of the outer 221 and inner 222 tubes can be circular. In other contemplated embodiments, the cross-sections of the tubes 221 and 222 can be another suitable shape, such as elliptical. As illustrated in FIG. 4B, the inner tube 222 is preferably concentric with the outer tube 221.

The outer tube 221 may have an external diameter from approximately thirty thousandths of an inch (30 mils) to forty thousandths of an inch (40 mils), and an internal diameter from approximately eighteen thousandths of an inch (18 mils) to thirty thousandths of an inch (30 mils). The inner tube 222 may have an external diameter from approximately eighteen thousandths of an inch (18 mils) to thirty thousandths of an inch (30 mils), and an internal diameter from approximately five thousandths of an inch (5 mils) to ten thousandths of an inch (10 mils). The inner tube 222 may define an inner cavity 228 enabling air flow. Similarly, the inner tube 222 and outer tube 221 may define an outer cavity 227 disposed between the tube 221 and 222, also enabling air flow. Placing an inner tube 222 within an outer tube 221 reduces the effective radius of the reference tube 220 without substantially decreasing its overall cross-sectional area, and hence the volume. Effectively, air traveling through the reference tube 220 must travel through either of the cavities 227 and 228, each having a smaller radius than tube 220 itself. As discussed above, reducing the effective radius of the tube 220 improves its viscous damping properties.

In the manner described above, the filter assembly 200 serves as a low-pass frequency filter, effectively eliminating dynamic pressure ($P_d$) while transmitting static pressure ($P_s$) to back of the diaphragm of a dynamic pressure sensor 110. The dimensions of the filter assembly's 200 components, the subassembly 210 and reference tube 220, can be selected such that the desired threshold frequency for the filter 200 may be achieved. In particular, the diameters and/or lengths of the pores of the filter 215, narrow tube 216, and tubes 221 and 222 may be selected to achieve the desired level of damping. Additional tuning may be possible after the filter assembly 200 is integrated into a transducer 100 by removing the subassembly 210 and replacing it with another subassembly having different damping properties. The filter assembly 200 of the present invention allows for precise control of the cut-off frequency that is allowed to reach the back of the dynamic pressure sensor's 110 diaphragm, enabling high sensitivity readings. Moreover, the adjustability of the threshold frequency by tuning the damping properties of the assembly 200 enables customization of the transducer 100 to different applications and changes in the environment.

The embodiments of a static-dynamic pressure transducer 100 described above present performance characteristics that will help advance turbine design and operation. The transducer 100 advances piezoresistive pressure sensor fabrication, packaging, testing and calibration, as well as theoretical knowledge of pressure waves propagating in micro-scale acoustic ducts with viscous forces. Designed for high temperature, rugged environments, the static-dynamic transducer 100 facilitates the simultaneous detection of all small oscillatory pressures on the order of two hundredths pounds per square inch (0.02) to fifty pounds per square inch (50) at frequencies above twenty-five hertz (25 Hz) and large static pressure changes, such as two hundred pounds per square inch (200) and greater. With this advancement in pressure sensing technology, turbine operators and manufacturers now have the ability to identify the earliest onset of compressor and combustion instabilities.

The static-dynamic transducer 100 may be calibrated statically on the sensor level and after the final assembly. Calibration provides sensitivity data for both the high pressure static sensor 120 and low pressure dynamic sensor 110. In order to determine the low-pass mechanical filter structure characteristics and the spectral response of the transducer 100, dynamic calibration may be necessary. Dynamic calibration may be achieved through the use of a dynamic pressure source, capable of generating a wide bandwidth of pressure signals.

FIGS. 5-9 and the accompanying disclosure below provide actual test results and performance characteristics of exemplary pressure sensors and filtering devices. The sensors and devices tested and represented in FIGS. 5 to 9 and the discussion below are exemplary only and are not intended to represent or limit the properties, characteristics, or behaviors of the embodiments of the present invention.

Figure 5:
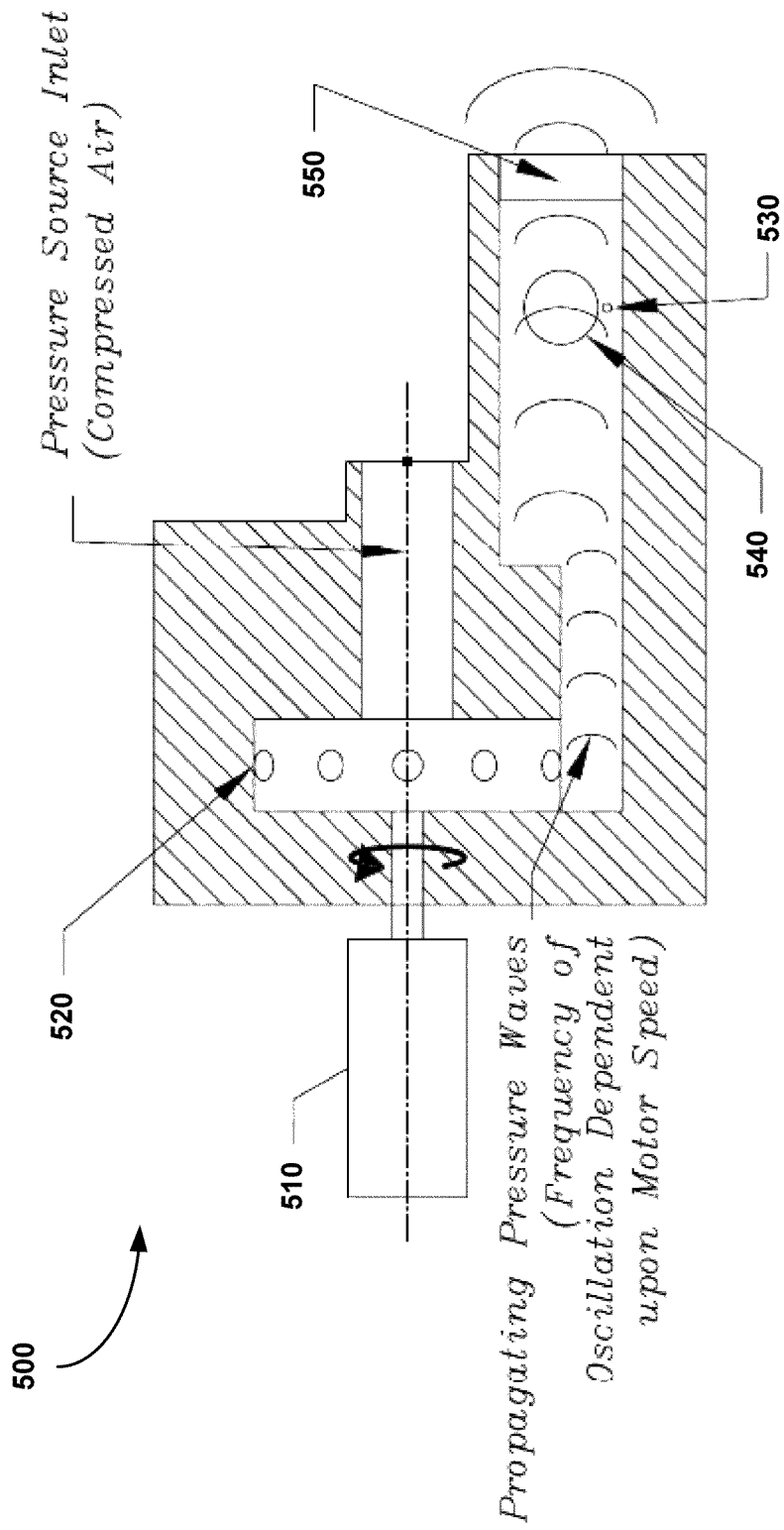
FIG. 5 illustrates an exemplary embodiment of a dynamic pressure source for frequency analysis of a pressure transducer and filter assembly.

FIG. 5 illustrates an exemplary embodiment of a dynamic pressure source 500 for frequency analysis of an exemplary pressure transducer and filter assembly. The dynamic pressure generator 500 consists of a high speed motor 510, a rotating valve 520, a reference pressure port 530, a static/dynamic sensor port 540, and a throttle valve 550. Compressed air at a substantially constant pressure may enter through a pressure source inlet. It then may pass through the shaft of the rotating valve 520. Air may then traverse the exit when a valve hole aligns with the entryway of the exit channel; consequently, an oscillating pressure is created in the exit channel. These pressure waves propagate down the exit channel and pass by an exemplary static-dynamic sensor and the reference sensor port 530. By comparing the pressures seen by each separate sensor, the frequency characteristics are determined. The dynamic calibration device 500 according to the described exemplary embodiment may produce reliable data from DC to two kilohertz (2 kHz). During each test, data may be recorded with a high speed data acquisition system.

Upon analysis of the results obtained using the generator 500 described above, it becomes apparent that a high pressure, static sensor, such as sensor 120, may not be able to accurately resolve known low-amplitude dynamic pressure signals, which may be superimposed on a large static pressure. The dynamic calibration device 500 generates pressure waves of decreasing magnitude as the frequency of oscillation increases. Therefore, a static sensor resolves the dynamic pressure when the pressure fluctuates by approximately fifteen pounds per square inch (15), but it fails when the pressure difference is at acoustic levels, such as three pounds per square inch (3) or less. By focusing on a selected region of the frequency sweep, the deficiency of the high pressure static sensor becomes apparent.

Figure 6:
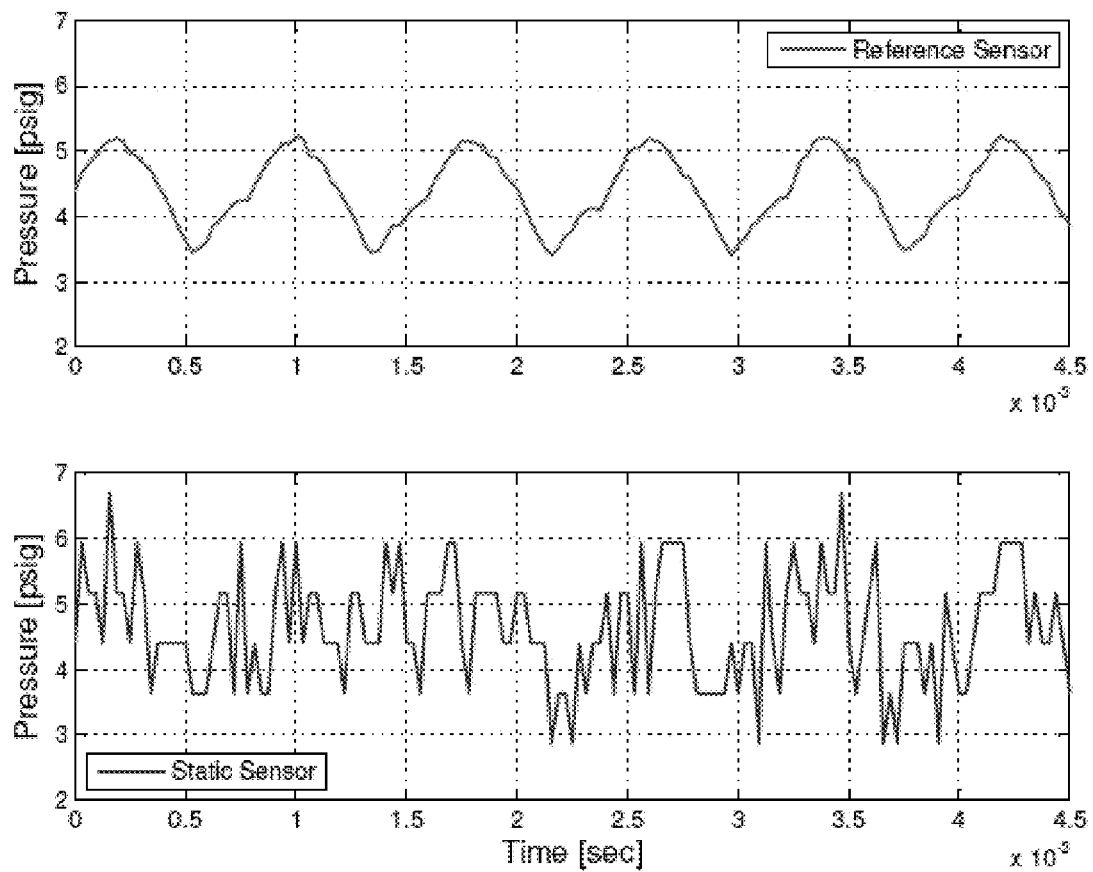
FIG. 6 illustrates measurements from an exemplary static pressure sensor using a dynamic pressure generator in accordance with an exemplary embodiment of the invention.

FIG. 6 illustrates measurements from an exemplary static sensor using an exemplary embodiment of a dynamic pressure generator 500. The bottom plot is an exemplary static sensor's measurement of a known dynamic pressure in the top plot. The known dynamic pressure oscillates at approximately one thousand two hundred fifty hertz (1,250 Hz) with a pressure difference of two pounds per square inch (2), and it is measured by the reference sensor in the dynamic calibration device 500. As FIG. 6 illustrates, a static sensor is incapable of resolving any resemblance of the generated sinusoidal dynamic pressure. Instead, the graph is full of sporadic system noise that does not appear to be anything more than a static pressure of approximately four and five tenths pounds per square inch (4.5). These results are due to the inverse relationship between pressure range and sensitivity for high pressure sensors. With such a high pressure sensor, low amplitude pressure changes are on the same order of magnitude as the electrical noise the static sensor experiences. Therefore, as expected, the static sensor is unable to accurately resolve low-pressure dynamic signals with any level of confidence.

Figure 7:
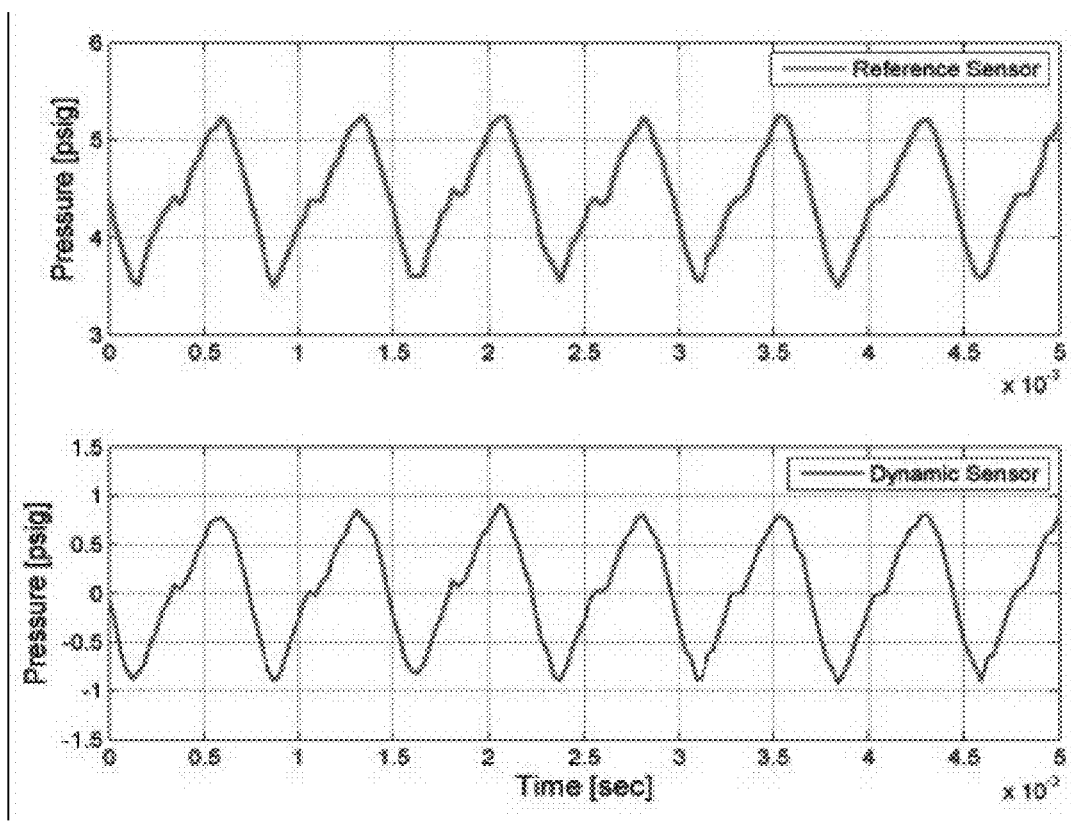
FIG. 7 illustrates measurements from exemplary static and dynamic pressure sensors using a dynamic pressure generator in accordance with embodiments of the present invention.

The results are different when the same measurement is taken with a dynamic sensor working in conjunction with an exemplary low-pass filter assembly. FIG. 7 illustrates measurements from an exemplary static-dynamic pressure sensor using the dynamic pressure generator 500. The dynamic sensor accurately reproduces a crisp, sinusoidal signal during the same test, in the identical region of FIG. 7, above. FIG. 7 displays these results compared to the low pressure reference sensor in the dynamic calibration device 500.

FIG. 7 verifies the heightened sensitivity a static-dynamic transducer provides for high pressure environments. The reference sensor (top plot), captures the full signal generated by the dynamic calibration device 500. While a static sensor does not detect this clear sinusoidal signal, a dynamic sensor (bottom plot), replicates it perfectly. As predicted and, now, validated through experimentation, a dynamic sensor within the device measures acoustic-level dynamic pressure changes that were previously undetectable. While a dynamic sensor does measure acoustic-level pressures, it does not detect slowly changing, large pressures, which is anticipated because a low-pass mechanical filter assembly may pass these pressures.

Figure 8:
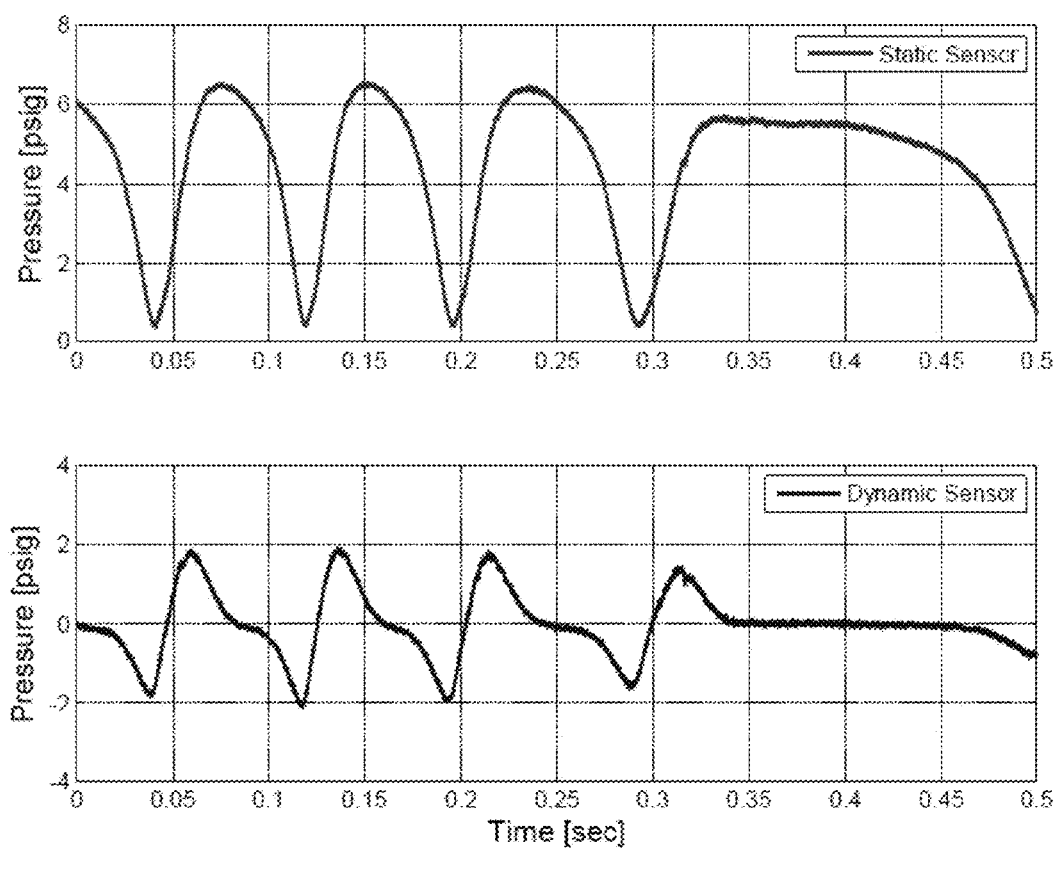
FIG. 8 illustrates an exemplary filter assembly passing slow changing large pressures.

FIG. 8 illustrates an exemplary filter assembly passing slow changing large pressures. A dynamic pressure sensor, bottom line, measures a lower magnitude pressure than a static sensor, top line. In other words, at low frequencies, part of the pressure signal reaches the back of a dynamic sensor's diaphragm, which results in attenuation of the signal and a phase shift, both of which can be observed in FIG. 8. At lower frequencies this attenuation increases until a constant pressure is reached; at which point, the dynamic sensor measures no pressure change whatsoever. This result is observable in FIG. 8, between thirty-five hundredths of a second (0.35 sec.) and forty-five hundredths of a second (0.45 sec.). The static sensor measures about five and five tenths pounds per square inch gage (5.5 g), while the dynamic sensor measures zero pounds per square inch gage (0 g). These results can be better understood as roll-off of a transfer function in a Bode plot. The data above only represent selected portions of the dynamic calibration frequency sweep. In order to compare the entire two kilohertz (2 kHz) spectrum, transfer functions are necessary. Transfer functions contain both magnitude and phase differences between pressure signals. In order to quantify these differences, the tests are conducted without the presence of a large static pressure so that a flush mounted, reference transducer can be implemented as the accepted pressure signal.

Figure 9:
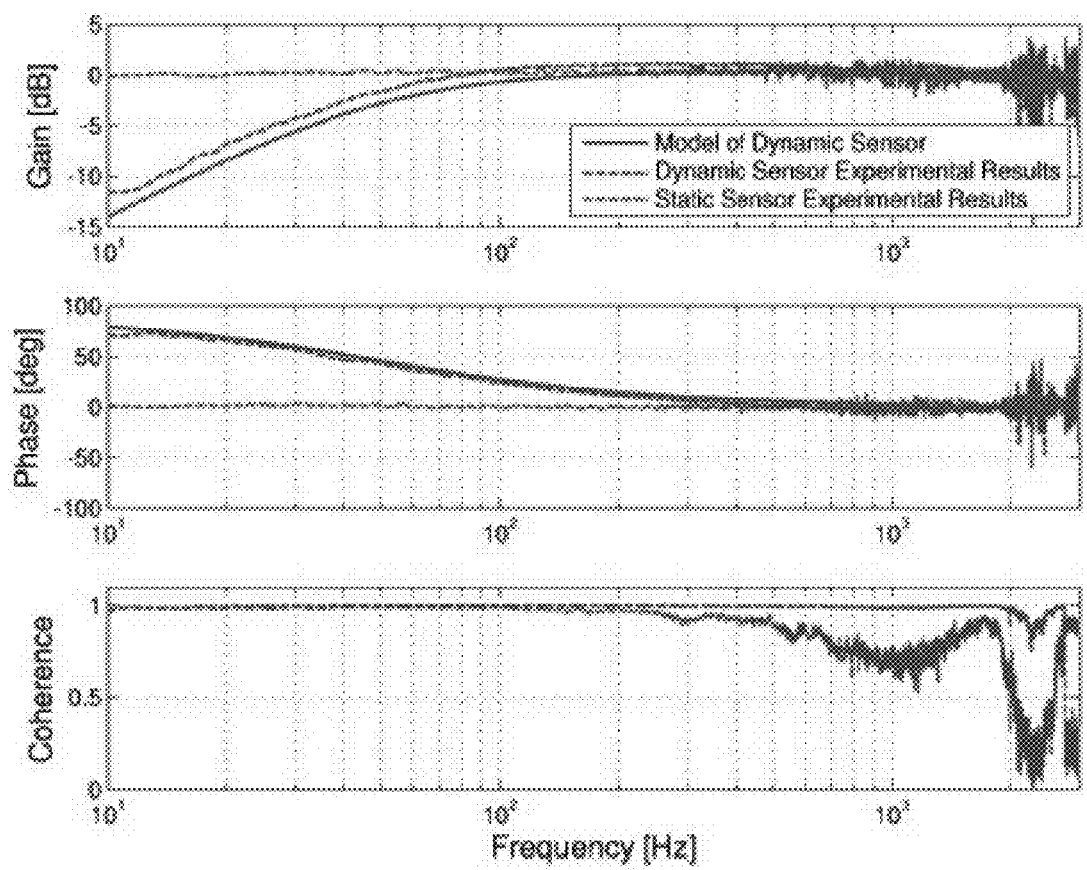
FIG. 9 illustrates transfer functions of results obtained using a dynamic pressure generator in accordance with exemplary embodiments of the invention.

FIG. 9 illustrates transfer functions of results obtained using the using an exemplary embodiment of a dynamic pressure generator 500. A dynamic sensor detects all pressure perturbations above approximately twenty-five hertz (25 Hz). Further, the experimental results show that a static sensor captures all low frequency pressure perturbations; however, it is insensitive to acoustic-level pressure signals. This insensitivity to small pressure perturbations can be observed in the gain versus frequency plot at the high end of the spectrum at which point the dynamic calibration device is generating one pound per square inch (1) dynamic pressure signal. At these low pressures, the static line is no longer flat and contains substantial noise. This noise, which is also observable in FIG. 6, reflects the fact that the static sensor is unable to accurately resolve such small pressure disturbances because the sensor's output at these pressures is almost the same in magnitude as the noise level within the system. The static sensor's inability to detect acoustic-level pressure perturbations is also observable in the coherence plot of FIG. 9. The coherence plot indicates the level of correlation between the two signals is independent of magnitude. The static transducer's deviation from one (1) in the coherence plot indicates that the pressure signal observed by the static sensor has too much noise to resemble the sinusoidal signal generated by the dynamic pressure source. This result matches the conclusions drawn from the magnified region of the static sensor's pressure measurement found in FIG. 6. The dynamic transducer easily measures this signal, as its coherence is a value of one (1) throughout the two kilohertz (2 kHz) range of the dynamic pressure source, as FIG. 7 suggests as well. While a high pressure static sensor fails in this instance, a dynamic sensor with the help of a low-pass filter structure, accurately resolves such small pressure perturbations, as the results prove. Therefore, static and dynamic sensors functioning simultaneously measure both the large pressure changes and any small pressure perturbations that may exist on top of the high pressure.

Therefore, while embodiments of this invention have been described in detail with particular reference to exemplary embodiments, those skilled in the art will understand that variations and modifications can be effected within the scope of the invention as defined in the appended claims. Accordingly, the scope of various embodiments of the present invention should not be limited to the above discussed embodiments, and should only be defined by the following claims and all equivalents.

What is claimed is:

1. A method, comprising:
   receiving, at a first filter having a plurality of pores, a pressure, wherein the pressure includes a static pressure component and a dynamic pressure component;
   filtering, by the first filter, at least a portion of the dynamic pressure component of the pressure;
   outputting, from the first filter, a filtered pressure; and
   wherein the filtered pressure is used to determine the dynamic pressure component.

2. The method of claim 1, further comprising:
   receiving, at a second filter, the filtered pressure; and
   filtering, by the second filter, at least a portion of the dynamic pressure component of the filtered pressure.

3. The method of claim 2, wherein the second filter is a restricting tube.

4. The method of claim 1, further comprising:
   receiving, at a third filter, the filtered pressure; and
   filtering, by the third filter, at least a portion of the dynamic pressure component of the filtered pressure.

5. The method of claim 4, wherein the third filter is a reference tube.

6. The method of claim 2, wherein a cross-sectional area of the first filter is greater than the cross-sectional area of the second filter.

7. The method of claim 1, further comprising:
   receiving, at a first surface of a first sensing element, the pressure;
   receiving, at a second surface of the first sensing element, the filtered pressure;
   measuring, by the first sensing element, a difference between the pressure and the filtered pressure, wherein the difference is associated with the dynamic pressure component of the pressure; and
   outputting, from the first sensing element, a first pressure signal associated with the dynamic pressure component of the pressure.

8. The method of claim 7, further comprising:
   receiving, at a second sensing element, the pressure;
   measuring, by the second sensing element, the pressure; and
   outputting, from the second sensing element, a second pressure signal associated with the pressure.

9. The method of claim 8, wherein the first pressure signal and the second pressure signal are used to determine the static pressure component of the pressure.

10. The method of claim 1, wherein each of the plurality of pores has an equivalent diameter.

11. The method of claim 1, wherein at least one of the plurality of pores has a different diameter.

12. A system, comprising:
    a filter sub-assembly, including:
       a housing disposed around and defining a chamber; and
       a first filter having a plurality of pores and disposed in the chamber, wherein the first filter is configured to:
          receive a pressure, wherein the pressure includes a static pressure component and a dynamic pressure component;
          filter at least a portion of the dynamic pressure component of the pressure; and
          output a filtered pressure, wherein the filtered pressure is used to determine the dynamic pressure component.

13. The system of claim 12, wherein the filter sub-assembly further includes:
    a second filter disposed in the chamber, wherein the second filter is configured to:
       receive the filtered pressure; and
       filter at least a portion of the dynamic pressure component of the filtered pressure.

14. The system of claim 13, further comprising:
    a plug disposed in the chamber; and
    wherein the second filter is a restricting tube and the restricting tube is disposed in the plug.

15. The system of claim 12, further comprising:
    a third filter operationally coupled to the filter sub-assembly, wherein the third filter is configured to:
       receive the filtered pressure; and
       filter at least a portion of the dynamic pressure component of the filtered pressure.

16. The system of claim 15, wherein the third filter is a reference tube.

17. The system of claim 12, wherein each of the plurality of pores has an equivalent diameter.

18. The system of claim 12, wherein at least one of the plurality of pores has a different diameter.

19. The system of claim 12, further comprising:
    a first sensor having a first surface and a second surface and operationally coupled to the filter sub-assembly, wherein the first sensor is configured to:
       receive, at the first surface of the first sensor, the pressure;
       receive, at the second surface of the first sensor, the filtered pressure;
       measure, by the first sensor, a difference between the pressure and the filtered pressure, wherein the difference is associated with the dynamic pressure component of the pressure; and
       output a first pressure signal associated with the dynamic pressure component of the pressure.

20. The system of claim 12, further comprising:
    a second sensor, wherein the second sensor is configured to:
       receive the pressure;
       measure the pressure; and
       output a second pressure signal associated with the pressure.

* * * * *